United States Patent [19]
Akedo et al.

[11] Patent Number: 5,899,237
[45] Date of Patent: May 4, 1999

[54] ABRASION RESISTANT COMPOSITE HOSE AND PROCESS FOR PRODUCING THE SAME

[75] Inventors: Youichi Akedo; Seiji Shiga; Tetsuya Inagake; Shoji Hattori; Yoshiki Yoshitomi, all of Kakegawa, Japan

[73] Assignee: Tigers Polymer Corporation, Osaka, Japan

[21] Appl. No.: 08/857,489

[22] Filed: May 16, 1997

[51] Int. Cl.⁶ .................................. F16L 11/00; F16L 9/14
[52] U.S. Cl. .................... 138/129; 138/173; 138/150; 138/144; 138/122
[58] Field of Search .................................. 138/129, 154, 138/121, 122, DIG. 1, 177, 137, 140, 141, 150, 153, 172, 173, 144

[56] References Cited

U.S. PATENT DOCUMENTS

| | | | |
|---|---|---|---|
| 2,330,651 | 9/1943 | Welger | 138/121 |
| 3,047,026 | 7/1962 | Kahn | 138/121 |
| 3,186,438 | 6/1965 | Holmgren | 138/121 |
| 4,067,362 | 1/1978 | Jackman | 138/173 |
| 4,140,154 | 2/1979 | Kanao | 138/132 |
| 4,304,266 | 12/1981 | Kutnyak et al. | 138/129 |
| 4,350,547 | 9/1982 | Kanao | 138/122 X |
| 4,490,575 | 12/1984 | Kutnyak | 138/129 X |
| 4,628,966 | 12/1986 | Kanao | 138/129 X |
| 5,046,531 | 9/1991 | Kanao | 138/153 X |
| 5,806,567 | 9/1998 | Fukui et al. | 138/137 X |

*Primary Examiner*—Patrick F. Brinson
*Attorney, Agent, or Firm*—Pillsbury Madison & Sutro LLP

[57] ABSTRACT

An abrasion resistant composite hose comprises (a) an outer layer composing a spiral tape of a soft synthetic resin, where adjacent side edges of the spiral tape join each other to form the outer layer, (b) a spiral reinforcement of a hard synthetic resin for retaining and reinforcing the outer layer, and (c) an inner layer comprising a spiral strip formed by a rubber, where adjacent side edges of the spiral strip join each other to form the inner layer, and the outer layer and inner layer join each other. In such a composite hose having this structure, at least a periphery of the strip except an exposed surface to an inner surface of the hose is covered with a covering element comprising a rubber adhesive to the soft synthetic resin constituting the outer layer, and the rubber strip is formed by a rubber having higher abrasion resistance than the covering element to obtain a composite hose having enhanced abrasion resistance.

8 Claims, 2 Drawing Sheets

1

ABRASION RESISTANT COMPOSITE HOSE AND PROCESS FOR PRODUCING THE SAME

FIELD OF THE INVENTION

This invention relates to a hose used for civil engineering works and other applications which require pressure proof properties (pressure resistance) or abrasion resistance.

BACKGROUND OF THE INVENTION

In a muddy water-shield process, reverse process, or other general civil engineering works, inhalation and compression-transport of muddy water, sand or sludge are required. Therefore, a hose used for such applications should light-weigh and should have flexibility, and it requires excellent abrasion resistance in addition to superior pressure proof.

Thus, a composite hose has been proposed, which is formed from a synthetic resin material with light weight and excellent flexibility and a rubber material having superior pressure proof and abrasion resistance. By way of illustration, Japanese Patent Publication No. 52317/1984 (JP-B-59-52317) proposes a flexible hose as produced by adhering an outer layer and an inner layer to form a composite, in which the outer layer is formed by spiraling a soft resin strip embedded with a hard reinforcement, and the inner layer is formed by winding a rubber strip in a spiral form. Such flexible hose is available on the market. The literature refers to a hard poly(vinyl chloride) as the hard resin of the reinforcement, and a soft poly(vinyl chloride) as the soft resin of the strip. It also mentions that a polysulfide rubber is preferred as the rubber constituting the inner layer.

The polysulfide rubber has, however, poor abrasion resistance and low adhesion force with respect to the outer layer. Therefore, when such hose is used for inhalation and compression-transport of drainage or sludge in civil engineering works, the inner layer of the hose damages in an early stage.

It has been also proposed to form the inner layer in the flexible hose from a rubber material comprising an acrylonitrile-butadiene rubber (NBR) as a main component to insure thermal adhesive properties with respect to a soft synthetic resin (e.g., a soft poly(vinyl chloride)) forming the outer layer. The rubber material (NBR) forming an inner surface of such a hose has abrasion resistance to some extent, which surface directly contacts transported substances as inhaled and compression-transported. The abrasion resistance of the rubber material (NBR) is, however, limited. Therefore, the hose has a short product-life when it is used in applications in which the inner surface abrades severely. Accordingly, a hose having an extremely improved abrasion resistance has been desired. On the other hand, when the inner layer is composed of a rubber having high abrasion resistance, thermal adhesive properties of the inner layer with respect to a constitutive soft synthetic resin (e.g., a soft poly(vinyl chloride)) of the outer layer deteriorates, and the inner layer and outer layer hardly adhere to each other with high adhesive force to form a composite.

SUMMARY OF THE INVENTION

It is, therefore, an object of the present invention to solve problems which conventional composite hoses comprising a synthetic resin material and a rubber material have, and to provide a flexible composite hose which insures greatly improved abrasion resistance and excellent durability, and a process for producing the hose.

It is another object of the invention to provide a composite hose which insures high adhesive properties of an inner layer with respect to an outer layer even when a rubber having high abrasion resistance is used as the inner layer, and a process for producing the same.

To accomplish the above objects, the present invention provides an abrasion resistant composite hose comprising (a) an outer layer composing a spiral tape of a soft synthetic resin, in which adjacent side edges of the spiral tape join or fuse each other to form the outer layer, (b) a spiral reinforcement of a hard synthetic resin for retaining and reinforcing the outer layer, and (c) an inner layer comprising a spiral strip formed by a rubber, in which adjacent side edges of the spiral strip adhere to each other to form the inner layer, and the outer layer and inner layer join or bond each other to form a composite, in which at least a periphery of the constitutive rubber strip of the outer layer except an exposed surface to an inner surface of the hose is covered with a covering element comprising a rubber which is adhesive to the soft synthetic resin constituting the outer layer, and the rubber strip comprises a rubber having higher abrasion resistance than the covering element, and a production process for the composite hose.

In the abrasion resistant composite hose, the soft synthetic resin tape constituting the outer layer may be formed from a soft poly(vinyl chloride), the rubber strip forming the inner layer may be formed from a rubber comprising a butadiene rubber (BR), a naturallyoccurring rubber (NR) or an isoprene rubber as a main component, and the covering element may be formed from a rubber containing a nitrile rubber (NBR) as a main component, typically speaking.

DETAILED DESCRIPTION OF THE INVENTION

An embodiment of the invention is now described based on the drawings.

Figure 1:
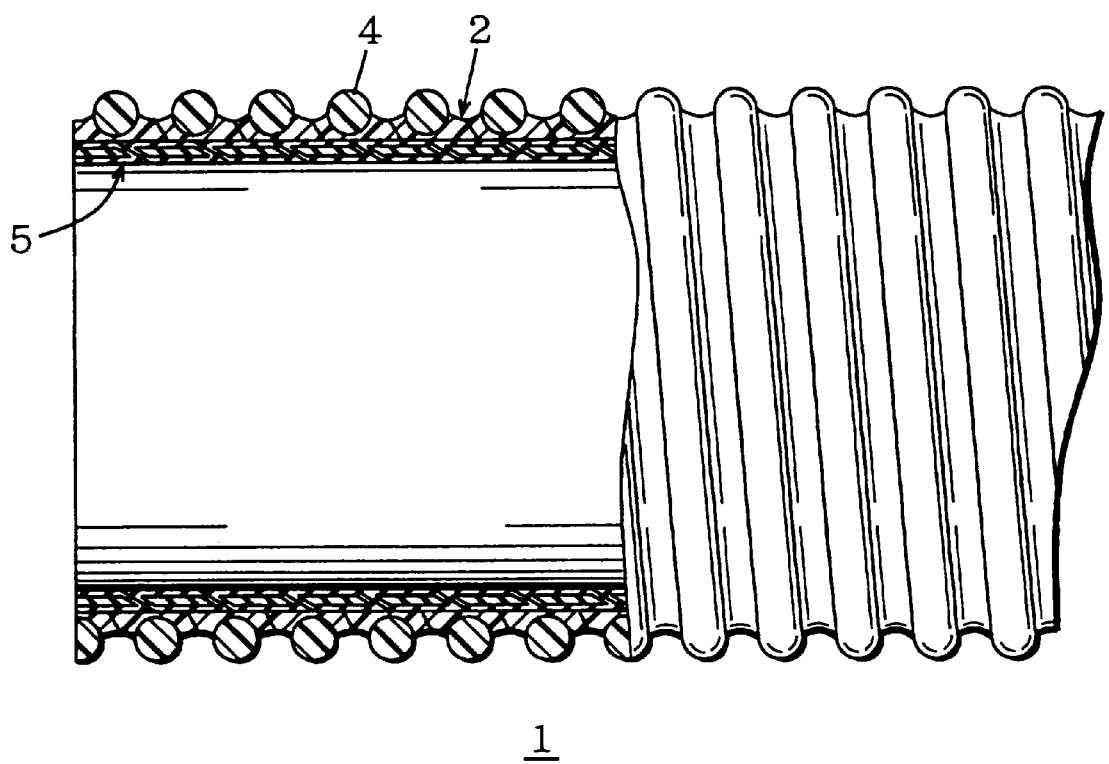
FIG. 1 is a partial cross-sectional view of the composite hose of the present invention.
Figure 2:
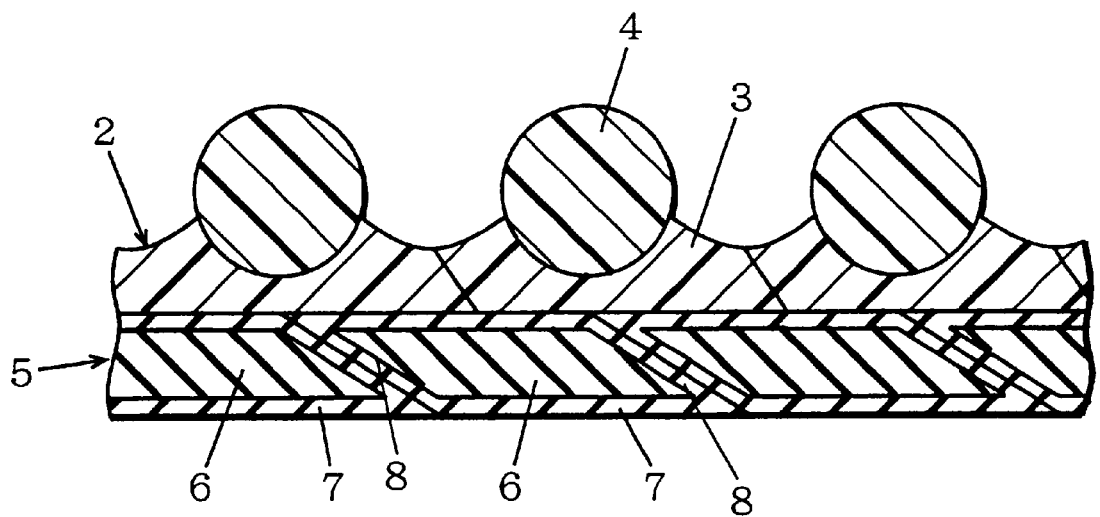
FIG. 2 is an enlarged cross-sectional view illustrating a hose wall of the composite hose in FIG. 1.

As illustrated in FIGS. 1 and 2, the abrasion resistant hose 1 according to the invention comprises an outer layer 2 composed of a soft synthetic resin (e.g., a soft poly(vinyl chloride) resin), a hard spiral reinforcement (reinforcer) 4 which is attached to an outer surface of the outer layer 2, and composed of a hard synthetic resin (e.g., a hard poly(vinyl chloride) resin), and an inner layer 5 that joins or fuses to an inner surface of the outer layer 2, and is composed of a rubber material.

The outer layer 2 is formed by winding (rolling up) a soft synthetic resin tape 3 as produced by extrusion-molding into a spiral form, and thermally fusing adjacent side edges of the wound tape each other. Accompanying with the extrusion-molding of the soft synthetic resin tape 3, the hard spiral reinforcement 4 is also extrusion-molded onto an outer surface of the tape 3, the molded reinforcement 4 is composed with the tape 3 by means of thermal fusion and attached in a spiral form to the tape 3 to retain the shape of the outer layer 2 in the form of a tube and to reinforce the outer layer.

As shown in FIG. 2 illustrating an enlarged view of a wall of the hose, the inner layer 5 is formed by winding a strip 6 into a spiral form, and which strip 6 has an almost parallelogrammic cross-section and is extrusion-molded and comprises a rubber material having excellent abrasion resistance as a main component. A covering element 7, which comprises a rubber having excellent adhesive properties, adheres to the whole periphery (circumference) of the strip 6 by means of vulcanization. That is, the covering element 7 respectively interposes between the outer layer 2 and the constitutive rubber strip 6 of the inner layer 5, and between adjacent side edges (adjacent sites) of the spiral rubber strip 6, and the outer layer 2 and inner layer 5 adhere or bond firmly to each other by vulcanization-adhesive. The strip (an article in the form of a band) 6 comprises a rubber having higher abrasion resistance than that of the covering element (coating member) 7. The covering element 7 can be formed by extruding an adhesive rubber for the formation of the covering element 7 from a crosshead of an extruder, accompanying with extrusion-molding of an abrasion resistant rubber for the formation of the strip 6, and joining the covering element 7 to the strip 6 in the crosshead, and covering the strip 6 with the covering element 7 to adhere each other. Therefore, the covering element 7 integrally adheres the periphery (circumference) of the strip 6. The adjacent side edges of the strip 6 can adhere to the covering element by means of vulcanization-adhesion in a vulcanization-molding step to integrally form an inner surface of the hose 1.

The tape 3 of a soft synthetic resin forming the outer layer 2, and the rubber strip 6 constituting the inner layer 5 are simultaneously wound into a spiral form on a molding former (not shown) for production of a hose, and the wound tape 3 and wound strip 6 are heated from inside of the molding former to vulcanize and mold unvulcanized rubbers each constituting the strip 6 or the covering element 7. By means of the vulcanization-molding, the covering element 7 adheres to the tape 3 as well, and the outer layer 2 and inner layer 5 adhere to each other integrally without separation.

To enhance durability of the hose 1, positions of adjacent spiral joint sites (thermal fused sites) of the soft synthetic resin tape 3 and adjacent spiral joint sites (vulcanization-adhered sites by the covering element 7) of the rubber strip 6 differ from each other in the longitudinal direction of the hose 1.

Such a constitutive soft synthetic resin of the outer layer includes a soft poly(vinyl chloride) [a plasticized poly(vinyl chloride)], a vinyl chloride-vinyl acetate copolymer, and an ethylene-vinyl acetate copolymer. As the soft synthetic resin, a soft poly(vinyl chloride) is usually employed. As the hard synthetic resin constituting the spiral reinforcement, there may be mentioned a resin having high mechanical strength and excellent flexibility, such as a hard poly(vinyl chloride) [a rigid poly(vinyl chloride)] and a vinyl chloride-acrylonitrile copolymer, among which a hard poly(vinyl chloride) can advantageously be employed.

The rubber of the strip to form the inner layer may only be a rubber material having higher abrasion resistance than the rubber forming the covering element. As the rubber material, a rubber having high abrasion resistance may be used singly or in combination with other material. Such rubber having high abrasion resistance includes at least one abrasion resistant rubber selected from a naturally-occurring rubber (NR), an isoprene rubber (IR), a butadiene rubber (BR), and a styrene-butadiene rubber (SBR). A preferred constitutive rubber of the inner layer includes a butadiene rubber (BR), a naturally-occurring rubber (NR) and an isoprene rubber (IR). These rubbers can be employed singly (e.g., single use of BR), or in combination. By way of an example, a butadiene rubber (BR) and a naturally-occurring rubber (NR) may be used in combination in a ratio of such that the former/the latter equals about 10/90 to 90/10 (by weight), preferably about 30/70 to 90/10 (by weight) and particularly about 50/50 to 90/10 (by weight). The inner layer in this embodiment is formed from a rubber material comprising a butadiene rubber (BR) and a naturally-occurring rubber in a weight ratio of such that the former (BR)/the latter (NR) equals 70/30. The inner layer may be formed from a combination of this rubber and a constitutive rubber of the covering element (e.g., an acrylonitrile-butadiene rubber (NBR)), as well.

As the covering element (coating material) 7, a rubber having excellent adhesive properties with respect to the outer layer and both side edges of the strip can be used. Such a rubber includes, for example, an acrylonitrile-butadiene rubber (i.e., a nitrile rubber (NBR)), an acrylonitrile-isoprene rubber (NIR), and a terpolymer rubber of butadiene-isoprene-acrylonitrile (NBIR). The covering element is usually composed of a nitrile rubber (NBR), and the covering element in this embodiment is formed from 100% by weight of NBR. The acrylonitrile content in the nitrile rubber may be selected within a range of about 15 to 50% by weight, and practically about 20 to 45% by weight.

As the constitutive rubber of the covering element 7, use can preferably be made of a rubber material that insures vulcanization-adhesion of the covering element to each other, particularly under almost no load (without external pressure), as described hereinafter.

Figure 3:
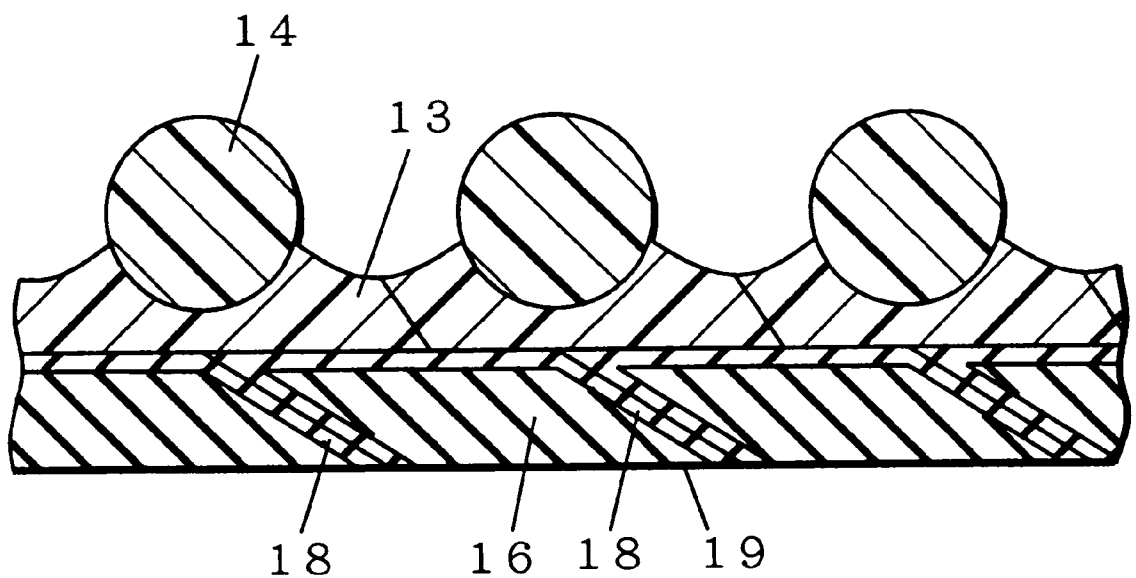
FIG. 3 is an enlarged cross-sectional view of a hose wall illustrating another embodiment of the invention.

The whole periphery of the strip 6 adheres to the covering element 7 in this embodiment, but as shown in FIG. 3, a covering element 17 may be formed on a surface of a strip 16, which surface is in contact with a tape 13 forming the outer layer (one surface of the strip 16), and on both slant sides 18, 18, which sides are in contact with adjacent strip 16 among the surfaces of the strip 16, and the covering element 17 may not cover or adhere to a surface 19 which is exposed to an inner surface of the hose (i.e., the other surface of the strip 16). Incidentally, a hard reinforcement 14 in the form of a spiral is partially buried or embedded in the tape 13 to retain and reinforce the outer layer in this embodiment.

In this invention, both sides of the tape and both sides of the strip usually slant or incline with respect to the longitudinal direction of the hose to form slant side faces.

The covering elements 7, 17 may preferably adhere to both side faces of the strips 6, 16 (in particular, both slant side faces 8, 8 and 18, 18). It is because if the covering elements 7, 17 do not interpose between both side faces 8, 8 and 18, 18 of the strips 6 and 16, side edges of the strips 6 and 16, comprising a rubber having high abrasion resistance such as a butadiene rubber BR or a naturally-occurring rubber NR, require to adhere directly each other by vulcanization. However, when the strips 6 and 16 are formed from a rubber material having higher abrasion resistance than the covering elements 7 and 17 comprising NBR or others, satisfactory adhesive strength would not be expected unless strips 6, 16 are heated and pressed to each other under sufficient pressure. Therefore, the strips 6, 16 hardly adhere to each other with high adhesive strength in a molding of a hose in which molding is conducted by vulcanization-molding with a scarce load. On the other hand, the covering elements 7, 17 insure satisfactorily high adhesive strength even when they are molded by vulcanization with a scarce load, such as in molding of the hose of the present invention, and therefore provide integrated composite hoses.

The present invention should by no means be limited to the above embodiments. By way of an example, the hard spiral (helical) reinforcements 4, 14 may only be in contact with at least a part of the tapes 3, 13 along the axial direction (longitudinal direction) of the spiral reinforcements 4, 14 to form a composite. The reinforcements 4, 14 may preferably be buried or embedded in the tapes 3, 13, and they may be buried in walls of the tapes 3, 13 to be extrusion-molded with the tapes 3, 13. A reinforcing member or a reinforcing element (a splicing yarn or string) may interpose between the outer layer 2 and the inner layer 5 to enhance pressure resistance (pressure proof) of the hose.

Various additives may be incorporated into the rubber, according to the species of the rubber. Such additives include, for instance, vulcanizing agents (curing agents), vulcanizing accelerators, vulcanizing-auxiliaries, vulcanization-retarders, age resistors (e.g., antioxidants, ultraviolet ray absorbents, heat-stabilizers (thermal stabilizers)), fillers, softening agents, plasticizers, tackifiers, lubricants, colorants (coloring agents), processing aid, and so forth.

The composite hose of the invention can be produced by vulcanization-molding technology for a hose. That is, a rubber is extrusion-molded into a strip, and the molded strip is spiraled on a molding former (a rod-shaped molding die). On the other hand, a linear reinforcement composed of a hard synthetic resin and a tape composed of a soft synthetic resin are joined in the die to be extrusion-molded, and the tape is spiraled on the strip for lamination, and the laminate is vulcanized and molded. The joint of the linear reinforcement and the tape can be carried out by contacting at least a part of the linear reinforcement with the tape, or burying the reinforcement in the tape.

According to the process of the invention for vulcanization-molding, at least an outer surface (i.e., a surface in contact with the tape) and both side edges of the strip are covered with the covering element (interposer) composed of a rubber that can adhere to the soft synthetic resin of the tape, and the covered strip is extruded and molded. The covering element (interposer) may cover a whole periphery of the strip, as mentioned above. Incidentally, extrusion-molding of the strip, spiral reinforcement, tape or covering element can be conducted, for example, by melting and kneading a resin composition or a rubber composition and extrusion-molding the molten composition from a die. By forming the strip from a rubber having higher abrasion resistance than the covering element in the extrusion-molding of the strip and the covering element, a composite hose having excellent abrasion resistance can be obtained.

Vulcanization-molding of the hose may usually effected by heating and vulcanizing the inner layer and outer layer, both layers are formed on the molding former, under no external load to composite the inner layer and outer layer, and pulling out the composite hose from the molding former. Incidentally, formation of the inner layer and outer layer, that is, extrution-molding and spiralling of the strip, reinforcement, tape or covering element can be carried out simultaneously or in turn.

The present invention insures greatly improved abrasion resistance of an inner surface of a hose, even the hose is a composite hose that is light-weighed and has high flexibility, and is produced by adhering and composing a synthetic resin material and a rubber material. Accordingly, the composite hose of the invention is useful as a hose for transporting a solid material, in particular as a hose having pressure resistance and abrasion resistance employed, e.g., in civil engineering works, for transporting a liquid containing a solid mattter.

What is claimed is:

1. An abrasion resistant composite hose comprising:
   (a) an outer layer comprising a spiral tape of a soft synthetic resin, in which adjacent side edges of the spiral tape join each other to form the outer layer,
   (b) a spiral reinforcement of a hard synthetic resin for retaining and reinforcing said outer layer, and
   (c) an inner layer comprising a spiral strip formed from a rubber, in which adjacent side edges of the spiral strip join each other to form the inner layer, and said outer layer and said inner layer join each other to form a composite hose,
   wherein at least a periphery of the constitutive rubber strip of the inner layer except for an exposed surface to an inner surface of the hose is covered with a covering element comprising a rubber, and the covering element is adhesive to the soft synthetic resin constituting said outer layer, and the rubber strip is formed by a rubber having higher abrasion resistance than the covering element.

2. The composite hose according to claim 1, wherein the spiral reinforcement is attached to or buried in the outer layer.

3. The composite hose according to claim 1, wherein the covering element interposes between adjacent sites of the spiral rubber strip, and between the rubber strip and the outer layer, respectively.

4. The composite hose according to claim 1, wherein adjacent spiral side edges of the tape join each other by thermal fusion to form the outer layer, and the covering element adheres to adjacent spiral side edges of the strip and to the outer layer by vulcanization to form the inner layer.

5. The composite hose according to claim 1, wherein the constitutive soft synthetic resin tape of the outer layer is formed from a soft poly(vinyl chloride), the constitutive rubber strip of the inner layer is formed from at least one member selected from a naturally-occurring rubber (NR), an isoprene rubber (IR), a butadiene rubber (BR) and a styrene-butadiene rubber (SBR), and the covering element is formed from a rubber comprising an acrylonitrile-butadiene rubber (NBR) as a main component.

6. The composite hose according to claim 1, wherein the constitutive rubber strip of the inner layer is formed from, as a main component, at least one rubber selected from a butadiene rubber, a naturally-occurring rubber and an isoprene rubber.

7. The composite hose according to claim 1, wherein a position of a spiral joined site of the adjacent soft synthetic resin tape, and a position of a spiral joined site of the adjacent rubber strip shift each other in a longitudinal direction of the hose.

8. A process for producing a composite hose, which comprises the steps of:
   extrusion-molding a rubber into a strip form,
   spiraling the strip on a molding former,
   joining and extrusion-molding a linear reinforcement composed of a hard synthetic resin and a tape composed of a soft synthetic resin,
   spiraling the molded tape and laminating the spiraled tape onto the strip, and
   vulcanizing and molding the laminate,
   wherein at least an outer surface and both side edges of the strip are covered with a covering element in an extrusion-molding step to form a covered strip, which covering element is composed of a rubber which can adhere to the soft synthetic resin of the tape, and the strip is formed from a rubber having higher abrasion resistance than the covering element.

* * * * *